3,370,068
1 - AMINO - 4 - [m - (DIETHYLAMINOETHYL-
SULFONYL) - ANILINO]-2-ANTHRAQUINONE
SULFONIC ACID
Fritz Meininger and Ernst Hoyer, Frankfurt am Main,
Germany, assignors to Farbwerke Hoechst Aktienge-
sellschaft vormals Meister Lucius & Bruning, Frank-
furt am Main, Germany, a corporation of Germany
No Drawing. Filed Aug. 6, 1964, Ser. No. 388,001
Claims priority, application Germany, Aug. 16, 1963,
F 40,499
4 Claims. (Cl. 260—374)

ABSTRACT OF THE DISCLOSURE 1-amino - 4 - (m - diethylaminoethylsulfone) - anilino-
anthraquinone-2-sulfonic acid dyestuffs capable of dyeing
cellulosic and nitrogenous fibers clear blue shades of
excellent fastness to light and good fastness to washing,
chlorine, water and rubbing.

The present invention relates to a new anthraquinone
dyestuff and to a process for preparing it; more partic-
ularly, the invention relates to a dyestuff of the follow-
ing formula

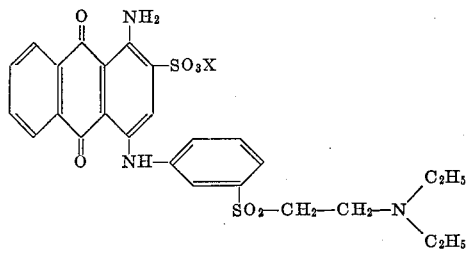

in which X represents a hydrogen, sodium or potassium
atom.

Now we have found that a valuable anthraquinone
dyestuff of the formula

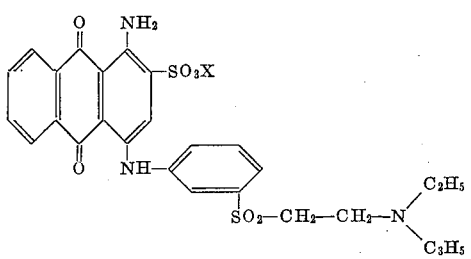

in which X represents a hydrogen, sodium or potassium
atom can be prepared by reacting the anthraquinone dye-
stuff of the formula

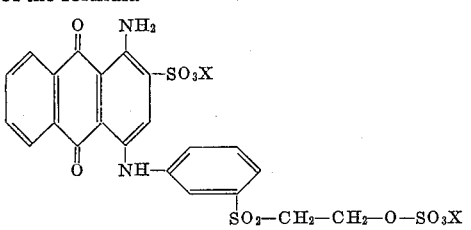

in which X has the meaning indicated above, with di-
ethylamine in an aqueous medium, if desired, in the pres-
ence of agents having an alkaline reaction.

The process for preparing the new anthraquinone dye-
stuff is advantageously carried out by combining an aque-
ous solution containing 1 mol of the starting dyestuff in
the form of an alkali metal salt with at least 2 mols of
diethylamine at room temperature or at an elevated tem-
perature and isolating the precipitated dyestuff subse-
quently by filtration. In order to obtain a complete
separation of the dyestuff sodium chloride or potassium
chloride may be added to the reaction mixture, if deisred.

The dyestuff of the formula mentioned above may be
prepared with the same result by reacting 1 mol of the
starting dyestuff in the form of an alkali metal salt, in
the presence of an agent having an alkaline reaction,
such as sodium hydroxide, potassium hydroxide, sodium
carbonate or potassium carbonate, in an aqueous medium
with only 1 mole of diethylamine.

Apart from by salting out with alkali metal chlorides
the reaction product may be separated also by adding
mineral acids, such as hydrochloric or sulfuric acid, at
a pH-value in the range from about 5.5 to 8 and is ob-
tained in the form of the internal salt. The dyestuff which
in this form is difficultly soluble in cold water is obtained
in pure state or having a low alkali metal salt content,
by filtration and washing with water.

The dyestuff obtained according to the process of the
invention is preferably used for dyeing cellulose ma-
terials, such as cotton, linen or viscose rayon. It is like-
wise suitable for dyeing nitrogenous fibers of animal and
synthetic origin, as for example wool and polyacrylnitrile
fibers.

As regards the dyeing of wool the new dyestuff is
distinguished by a good affinity in a neutral bath, in con-
trast to the comparable dyestuff of the following formula

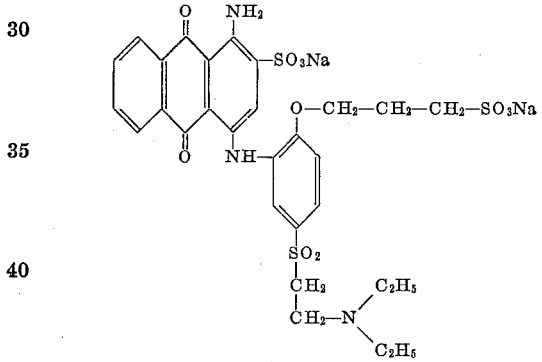

described in German Patent No. 1,103,886.

Polyacrylonitrile fibers can be dyed with the dyestuff
obtained according to the present invention in a weakly
formic acid bath at an elevated temperature, for example
at 120° C. In this respect, the dyestuff of the present
invention is distinguished favorably from the dyestuff de-
scribed in German Patent No. 1,103,886 which under
the same conditions does not dye polyacrylonitrile fibers.

Fabrics made of cellulose fibers are printed, for ex-
ample, with a printing paste containing in addition to the
dyestuff a thickening agent and an agent having an alka-
line reaction, such as sodium hydroxide or sodium car-
bonate, and subsequently heated, for instance by steam-
ing. The printing pastes containing an agent having an
alkaline reaction which are used for preparing the prints
possess an excellent stability. In this respect, the new dye-
stuff is far superior to the camparable dyestuff of the
following formula

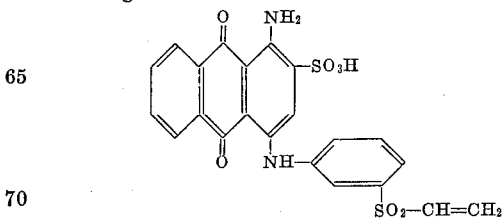

known from German Patent No. 960,534.

The dyestuff obtainable according to the process of the invention has a high tinctorial strength. It may be used for preparing blue prints on cotton which are distinguished by their pure shades as well as a good fastness to washing, chlorine, water and rubbing. In addition, they show excellent fastness properties to the action of light.

The following examples serve to illustrate the invention but they are not intended to limit it thereto, the parts being by weight unless otherwise stated.

*Example 1*

1168 parts of the dyestuff of the formula

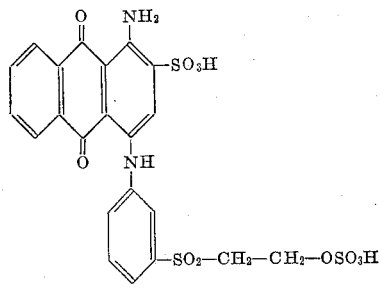

are dissolved in 10,000–11,000 parts of water at about 70° C. The solution is cooled to 40° C. and 150 parts of diethylamine are added. Then the whole is cooled at 25–30° C. by adding 1000 parts of ice and at this temperature 325 parts of a 33% sodium hydroxide solution are slowly added, until the pH-value has reached 12.0–12.5. The whole is stirred for 16 hours at 18–22° C., then the pH-value of the reaction mixture is adjusted to 7.8–8.3 by adding about 360 parts of hydrochloric acid of 20% strength and the precipitated dyestuff is filtered with suction. The filtration residue is washed with 1000 parts of water and dried at 60–65° C. 1212 parts of a dark blue powder are obtained which are mixed with 522 parts of a condensation product of 2 mols of naphthalene-2-sulfonic acid and 1 mol of formaldehyde and ground.

40 parts of the dyestuff obtained in this manner, 50 parts of urea and 15 parts of sodium carbonate are dissolved in 300 parts of hot water, made up to 1000 parts by means of a neutral 4% alginate thickening and stirred thoroughly. The cotton fabric printed with this printing paste is steamed for 5–7 minutes at 100° C., rinsed first with cold and then with hot water and eventually aftertreated at the boil with a solution containing 3 g. of soap and 1 g. of sodium carbonate per liter.

A clear blue print is obtained having an excellent fastness to light and good wet fastness properties.

*Example 2*

1168 parts of the starting dyestuff of the formula mentioned in Example 1 are dissolved in 9,000–10,000 parts of water at about 70° C. The solution is cooled to 40–50° C., then 300 parts of diethylamine are added drop by drop, and the mixture is stirred for 16–20 hours at 20–40° C. By addition of about 250 parts of glacial acetic acid the pH-value of the mixture is adjusted to 6 and the precipitated dyestuff is filtered with suction. The filtration residue is washed with water and then dried at 60° C. 1190 parts of a blue powder are obtained corresponding to the dyestuff obtained according to Example 1.

*Example 3*

534 parts of the starting dyestuff described in Example 1 are dissolved in 5000 parts of water at 70–75° C. and then cooled to 60–65° C. At this temperature a solution of 150 parts of anhydrous sodium carbonate in 630 parts of water is added dropwise. The reaction mixture which shows an alkaline reaction to phenolphthalein is stirred for 30 minutes at 60–65° C. and about 3000 parts of crushed ice are added which cause reduction of the temperature to 30° C. Then 80 parts of diethylamine are added and the whole is stirred for 30 hours at room temperature. Subsequently, the pH-value of the mixture is adjusted to 7.0 by adding 130 parts of glacial acetic acid, the precipitated dyestuff is filtered with suction and dried at 60° C. 600 parts of a blue powder are obtained corresponding to the dyestuff described in Example 1.

We claim:

1. An anthraquinone dyestuff of the formula

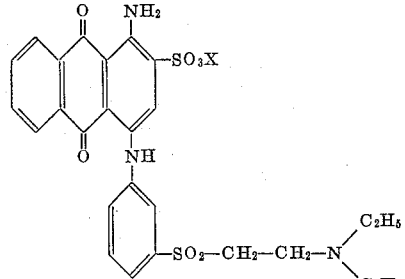

wherein X represents a member selected from the group consisting of hydrogen, sodium and potassium.

2. The anthraquinone dyestuff of the formula

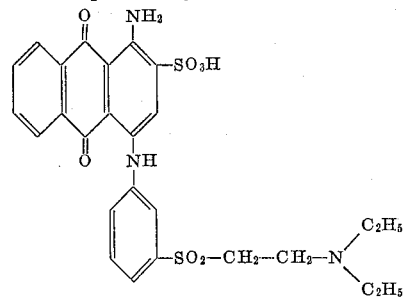

3. The anthraquinone dyestuff of the formula

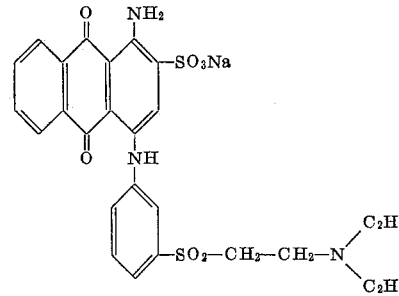

4. The anthraquinone dyestuff of the formula

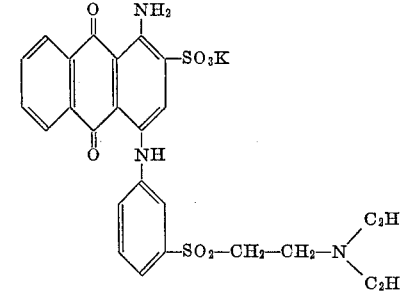

References Cited

UNITED STATES PATENTS 3,102,894   9/1963   Lodge _____ 260—374

FOREIGN PATENTS 1,103,886   12/1961   Germany.

OTHER REFERENCES

Virnik et al.: Chemical Abstracts, vol. 57, pp. 2449(f)–2450(a) (1962).

LORRAINE A. WEINBERGER, *Primary Examiner.*

H. C. WEGNER, *Assistant Examiner.*